(12) United States Patent
Nakamura et al.

(10) Patent No.: US 12,194,597 B2
(45) Date of Patent: Jan. 14, 2025

(54) DUST COLLECTING ATTACHMENT AND POWER TOOL

(71) Applicant: MAKITA CORPORATION, Anjo (JP)

(72) Inventors: Shin Nakamura, Anjo (JP); Takafumi Kotsuji, Anjo (JP); Masatoshi Nakahama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 468 days.

(21) Appl. No.: 17/536,311

(22) Filed: Nov. 29, 2021

(65) Prior Publication Data

US 2022/0168867 A1 Jun. 2, 2022

(30) Foreign Application Priority Data

Nov. 30, 2020 (JP) .................................. 2020-197979

(51) Int. Cl.
*B24B 55/10* (2006.01)
*B23Q 11/00* (2006.01)

(52) U.S. Cl.
CPC ........ *B24B 55/105* (2013.01); *B23Q 11/0046* (2013.01)

(58) Field of Classification Search
CPC ........... B24B 7/18; B24B 7/182; B24B 7/184; B24B 7/186; B24B 55/04; B24B 55/052; B24B 55/055; B24B 55/06; B24B 55/10; B24B 55/102; B24B 55/105; B23Q 11/0046
USPC ................................ 451/359, 351, 453, 456
See application file for complete search history.

(56) References Cited

U.S. PATENT DOCUMENTS

| 5,419,737 | A | 5/1995 | Brazell et al. | |
| 6,514,131 | B1* | 2/2003 | Reich | B23Q 11/0046 |
| | | | | 451/344 |
| 8,282,447 | B1* | 10/2012 | Buser | B24B 55/102 |
| | | | | 451/457 |
| 8,702,478 | B2* | 4/2014 | Loveless | B24B 23/028 |
| | | | | 24/683 |

(Continued)

FOREIGN PATENT DOCUMENTS

| JP | S58-089334 U | 6/1983 |
| JP | H06-075705 U | 10/1994 |

(Continued)

OTHER PUBLICATIONS

Mar. 26, 2024 Notice of Reasons for Refusal issued in Japanese Patent Application No. 2020-197979.

*Primary Examiner* — Brian D Keller
*Assistant Examiner* — Jason Khalil Hawkins
(74) *Attorney, Agent, or Firm* — Oliff PLC

(57) ABSTRACT

A dust collecting attachment removably attachable to a power tool that includes a housing and a spindle: a covering part formed such that a drive axis of a spindle passes through the inside of a suction hole in the attached state of the power tool and at least partially covers a periphery of the tool mounting part; a discharging part connected to the covering part and configured to discharge dust from the inside of the covering part; and at least one elastically deformable engagement piece connected to the covering part and having a claw configured to engage with the housing at a predetermined position of the housing.

20 Claims, 14 Drawing Sheets

(56) References Cited

U.S. PATENT DOCUMENTS

| | | | |
|---|---|---|---|
| 8,764,518 B2* | 7/2014 | McCutchen | B24B 55/05 |
| | | | 451/359 |
| 8,784,164 B2* | 7/2014 | Dai | B24B 55/05 |
| | | | 451/451 |
| 9,393,658 B2* | 7/2016 | Walker | B24B 23/04 |
| 2008/0171501 A1* | 7/2008 | Woods | B24B 55/102 |
| | | | 451/451 |
| 2011/0275293 A1* | 11/2011 | Eto | B24B 55/10 |
| | | | 451/453 |
| 2012/0184193 A1* | 7/2012 | Numata | B24B 55/05 |
| | | | 451/453 |
| 2013/0115863 A1 | 5/2013 | Mizutani et al. | |
| 2018/0326555 A1* | 11/2018 | Moller | B24B 55/052 |
| 2021/0260722 A1* | 8/2021 | Otani | B24B 23/02 |
| 2021/0316417 A1* | 10/2021 | Otani | B25F 5/02 |

FOREIGN PATENT DOCUMENTS

| | | |
|---|---|---|
| JP | H7-186047 A | 7/1995 |
| JP | 5775795 B2 | 9/2015 |
| JP | 2020-023006 A | 2/2020 |

* cited by examiner

DUST COLLECTING ATTACHMENT AND POWER TOOL

CROSS REFERENCE TO RELATED ART

The present application claims priority to Japanese Patent Application No. 2020-197979 filed on Nov. 30, 2020, the disclosure of which is hereby incorporated by reference in its entirety.

TECHNICAL FIELD

The present disclosure relates to a dust collecting attachment and a power tool to which the dust collecting attachment is attachable.

RELATED ART

Known dust collecting attachments are configured be attached to (mounted on) electric power tools such as sanders and grinders and to collect dust generated during a processing operation performed on a workpiece. Japanese Patent No. 5775795 discloses a dust collecting attachment including: a suction portion mounted on a portion of a housing where an output shaft projects; a hose having a front end connected to the suction portion; a discharging portion connected to a rear end of the hose; an engaging member for engaging the suction portion to the housing; and a changeable member that allows the discharging portion to be mounted at any position around an axis of the housing.

In the dust collecting attachment disclosed in Japanese Patent No. 5775795, although the direction of the hose relative to the housing can be changed by selecting the direction in which the changeable member is mounted on the discharging portion, there may be a case in which it takes time and effort to attach the dust collecting attachment to the power tool. Therefore, there is a demand for a new dust collecting attachment that can be more easily attached to a power tool.

SUMMARY

According to a first aspect of the present disclosure, there is provided a dust collecting attachment that is removably attachable to a power tool and configured to collect dust generated during a processing operation performed on a workpiece by the power tool. The power tool includes a housing and a spindle. The housing extends in a front-rear direction. The spindle extends along a drive axis extending in an up-down direction perpendicular to the front-rear direction. A lower end part of the spindle is configured to protrude downward from a front end part of the housing to form a tool mounting part to which a tool accessory is removably attachable. The dust collecting attachment includes a covering part, a discharging part, and at least one engagement piece. The covering part has a suction hole. The covering part is configured such that, in an attached state in which the dust collecting attachment is attached to the power tool, the drive axis passes through the suction hole. The covering part is configured to at least partially covers a periphery of the tool mounting part in the attached state. The discharging part is connected to the covering part. The discharging part is configured to discharge the dust from the inside of the covering part. The at least one engagement piece is connected to the covering part. The at least one engagement piece is configured to be elastically deformable. The at least one engagement piece has a claw (hook, engagement protrusion or projection). The claw is configured to engage with the housing at a predetermined position of the housing.

According to this aspect, the dust collecting attachment can be attached to (mounted on) the power tool by engagement between the claw provided on the at least one engagement piece and the housing at a predetermined position of the housing. Therefore, it is possible to provide a new dust collecting attachment which can be easily attached to a power tool.

DETAILED DESCRIPTION

Figure 1:
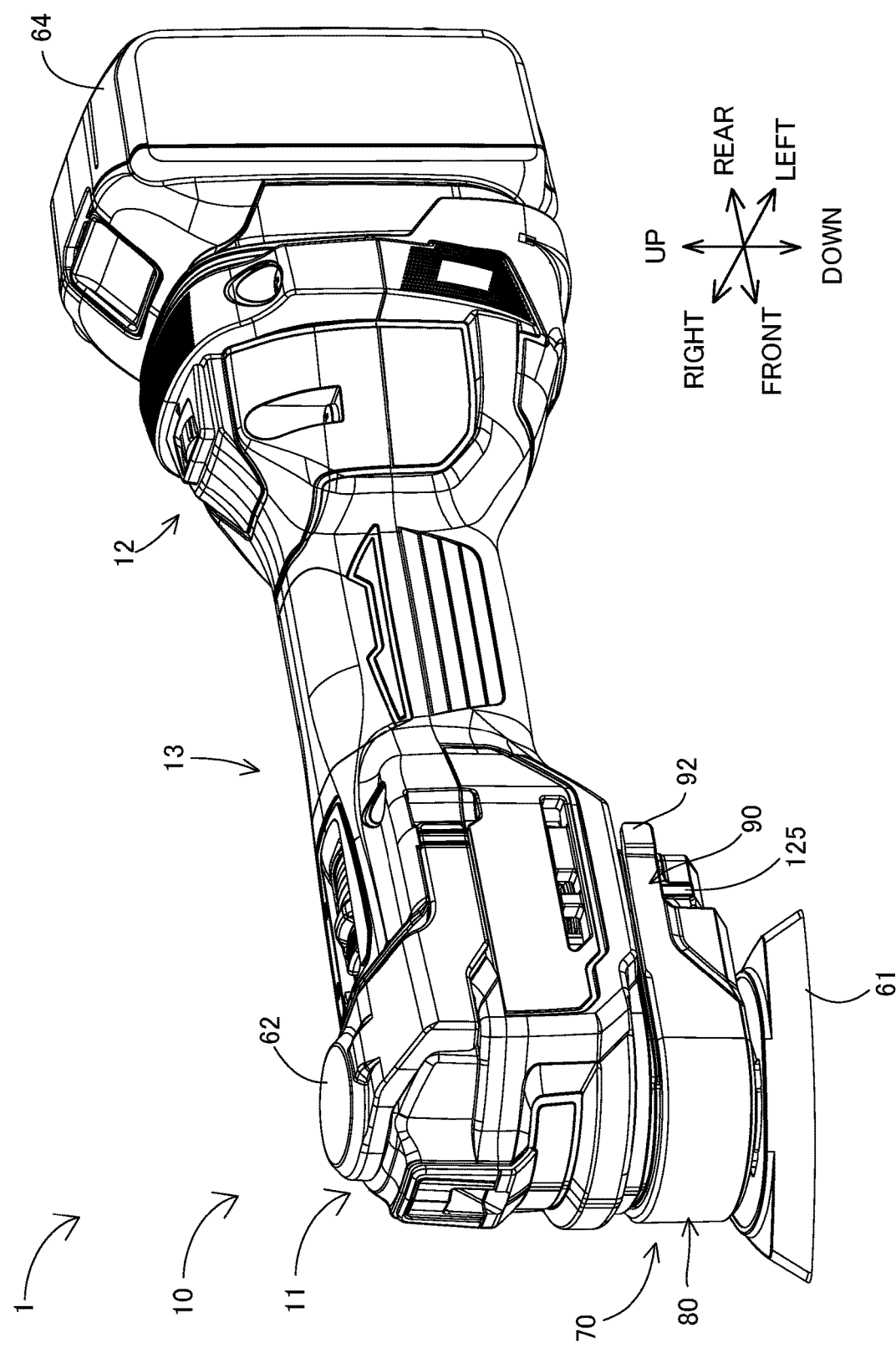
FIG. 1 is a perspective view of an oscillating multi-tool with a dust collecting attachment and a tool accessory attached thereto.

In one, non-limiting embodiment of the present disclosure, the at least one engagement piece may extend in a direction that intersects the drive axis in the attached state.

According to this embodiment, the user can engage the dust collecting attachment with the power tool at the predetermined position of the housing in the direction that intersects the drive axis.

In addition or in the alternative to the preceding embodiment of the present disclosure, the at least one engagement piece may extend in the front-rear direction in the attached state.

According to this embodiment, the engagement piece extends in the direction that is the same as the extending direction of the housing. Therefore, the user can engage the dust collecting attachment with the power tool at the predetermined position of the housing in the front-rear direction while moving the at least one engagement piece along the housing in the front-rear direction.

In addition or in the alternative to the preceding embodiments of the present disclosure, in the attached state, a front end of the at least one engagement piece may be connected to the covering part. In the attached state, the claw may be provided on a rear part of the at least one engagement piece in the front-rear direction.

According to this embodiment, the user can engage the dust collecting attachment with the power tool on the rear part of the front end part of the housing.

In addition or in the alternative to the preceding embodiments of the present disclosure, the at least one engagement piece may include two engagement pieces. The two engagement pieces may face each other across a plane that contains the drive axis in the attached state.

According to this embodiment, the dust collecting attachment can be attached to the power tool by engagement between the two engagement pieces and the housing at two positions located on opposite sides of the plane that contains the drive axis, thereby stabilizing the attached state of the dust collecting attachment to the power tool.

In addition or in the alternative to the preceding embodiments of the present disclosure, the discharging part may be a tubular member extending in a direction that intersects the front-rear direction. Further, the discharging part may include a first end part and a second end part that is opposite to the first end part. The first end part may be connected to the covering part and communicatively connect the inside of the covering part with the inside of the discharging part. The second end part may be configured to operatively connected to a suction device.

According to this embodiment, since the discharging part extends in the direction that intersects the front-rear direction, which is the extending direction of the housing, it can reduce the possibility that the discharging part and/or the suction device operatively connected to the second end part of the discharging part interfere with the power tool in use.

In addition or in the alternative to the preceding embodiments of the present disclosure, the covering part, the at least one engagement piece, and the discharging part may be formed of a single member.

According to this embodiment, as compared with a structure in which the dust collecting attachment is formed of a plurality of members, the user can more easily attach the dust collecting attachment to the power tool.

In addition or in the alternative to the preceding embodiments of the present disclosure, the at least one engagement piece may include a tab that extends in a direction that is different from a direction in which the claw protrudes from the engagement piece. The tab may be adapted to be pinched by a user.

According to this embodiment, the user can disengage (remove) the claw from the housing by pinching the tab to elastically deform the engagement piece. Therefore, the user can easily remove (detach) the dust collecting attachment from the power tool.

In addition or in the alternative to the preceding embodiments of the present disclosure, the covering part may include a bottom part and a peripheral wall. The bottom part may be provided with the suction hole. The peripheral wall may be connected to the bottom part and extends in the up-down direction. The peripheral wall may include a first wall and a pair of second walls. The first wall may be arc-shaped. The first wall may be located at the front in the front-rear direction in the attached state. The first wall may extend along the suction hole. The pair of second walls may be connected to the first wall. The pair of second walls may extend rearward from the first wall. The discharging part may be connected to one of the pair of second walls. Further, the discharging part may extend in a direction that intersects the front-rear direction. The at least one engagement piece may include a pair of engagement pieces each having a front end. The pair of engagement pieces may extend rearward in the front-rear direction with the front ends thereof respectively connected to the second walls. The pair of engagement pieces may face each other across a plane that contains the drive axis. The claw may be provided on each of the pair of engagement pieces. The claw may protrude toward the plane that contains the drive axis in the attached state. Each of the at least one engagement piece may include a tab. The tab may be provided rearward of the claw. The tab may protrude rearward in the front-rear direction. The tab may be configured to be adapted to be pinched by a user.

According to this embodiment, the dust collecting attachment can engage with the power tool at two positions located on opposite sides of the plane that contains the drive axis, thereby stabilizing the attached state of the dust collecting attachment to the power tool. In addition, since the discharging part extends in the direction that intersects the front-rear direction, which is the extending direction of the housing, it can be reduce the possibility the suction device operatively connected to the discharging part interferes with the power tool in use. Further, since the engagement piece is provided with the tab that is disposed rearward of the claw and protrudes rearward, the user can remove the dust collecting attachment from the power tool by pinching the tab from the rear.

In addition or in the alternative to the preceding embodiments of the present disclosure, the covering part may include a first protrusion (projection) or a first recess. The first protrusion or the first recess may be configured to engage with the housing at a position that is different from the predetermined position at which the claw engages with the housing.

According to this embodiment, it is possible to further stabilize the attached state of the dust collecting attachment to the power tool as compared with a structure in which the covering part does not include the first protrusion or the first recess.

In addition or in the alternative to the preceding embodiments of the present disclosure, there is provided a power tool to which the dust collecting attachment is configured to be removably attachable. The power tool may include a housing. The housing may include an engagement part and a guiding part. The engagement part may be configured to engage with the claw of the dust collecting attachment. The guiding part may be configured to guide the claw toward the engagement part.

According to this embodiment, the guiding part can guide the claw of the dust collecting attachment toward the engagement part of the housing. Therefore, the user can more easily attach the dust collecting attachment to the power tool.

In addition or in the alternative to the preceding embodiments of the present disclosure, the housing may include a second recess or a second protrusion. The second recess or the second protrusion may be configured to engage with the first protrusion or the first recess at a position that is different from the predetermined position at which the claw engages with the engagement part of the housing.

According to this embodiment, it is possible to stabilize the attached state of the dust collecting attachment to the power tool as compared with a structure in which the housing does not include the second protrusion or the second recess.

In addition or in the alternative to the preceding embodiments of the present disclosure, the engagement part may be disposed rearward of the guiding part. Further, the engagement part may be formed as a recess on a side wall of the housing. The guiding part may include a groove and an inclined surface. The groove may be formed on the side wall and extend in the up-down direction. The inclined surface may be provided between the groove and the engagement part in the front-rear direction. The inclined surface may be inclined from the groove toward the engagement part in a direction away from the plane that contains the drive axis.

According to this embodiment, the user can cause the claw to engage with the engagement part by moving the claw along the groove in the up-down direction, and then moving the claw along the inclined surface provided behind the groove in the front-rear direction. Therefore, the user can more easily attach the dust collecting attachment to the power tool.

In addition or in the alternative to the preceding embodiments of the present disclosure, the power tool may comprise a motor having an output shaft. The motor may be housed in the front end part of the housing. The output shaft may extend in parallel with the spindle.

According to this embodiment, since the motor is housed in the front end part of the housing, the front end part can be made larger as compared with a structure in which the motor is housed in a portion other than the front end part of the housing. Therefore, the dust collecting attachment can be easily attached to the relatively large front end part of the power tool, and other portions of the housing can be formed small.

The techniques of the present disclosure may be embodied in various forms other than dust collecting attachments and power tools. For example, the techniques of the present disclosure can be embodied as a power tool to which the dust collecting attachment is attachable and a method of attaching/detaching the dust collecting attachment to/from the power tool, among others.

EMBODIMENTS

Figure 2:
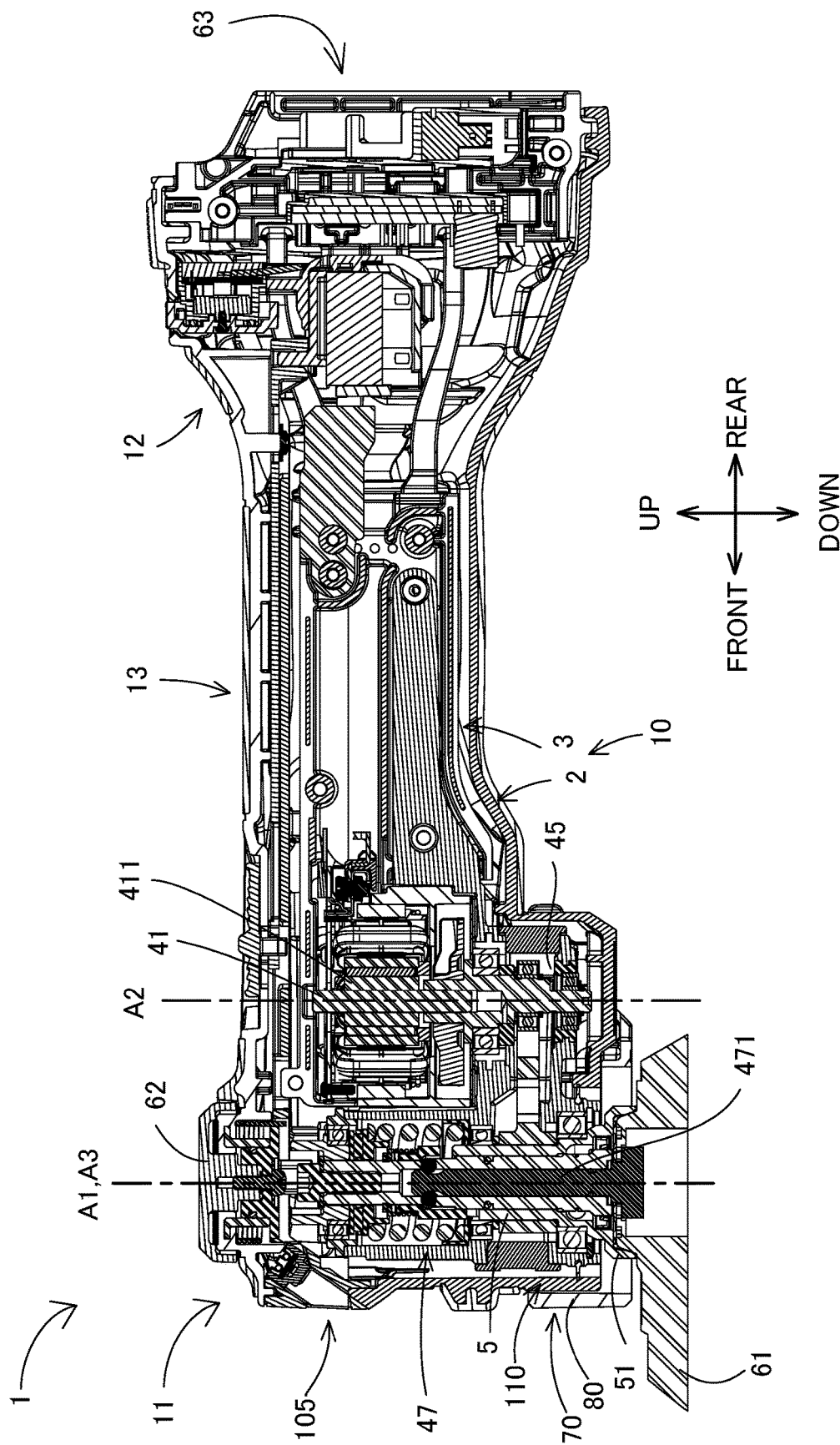
FIG. 2 is a schematic longitudinal cross-sectional view of the oscillating multi-tool with a dust collecting attachment and a tool accessory attached thereto.
Figure 14:
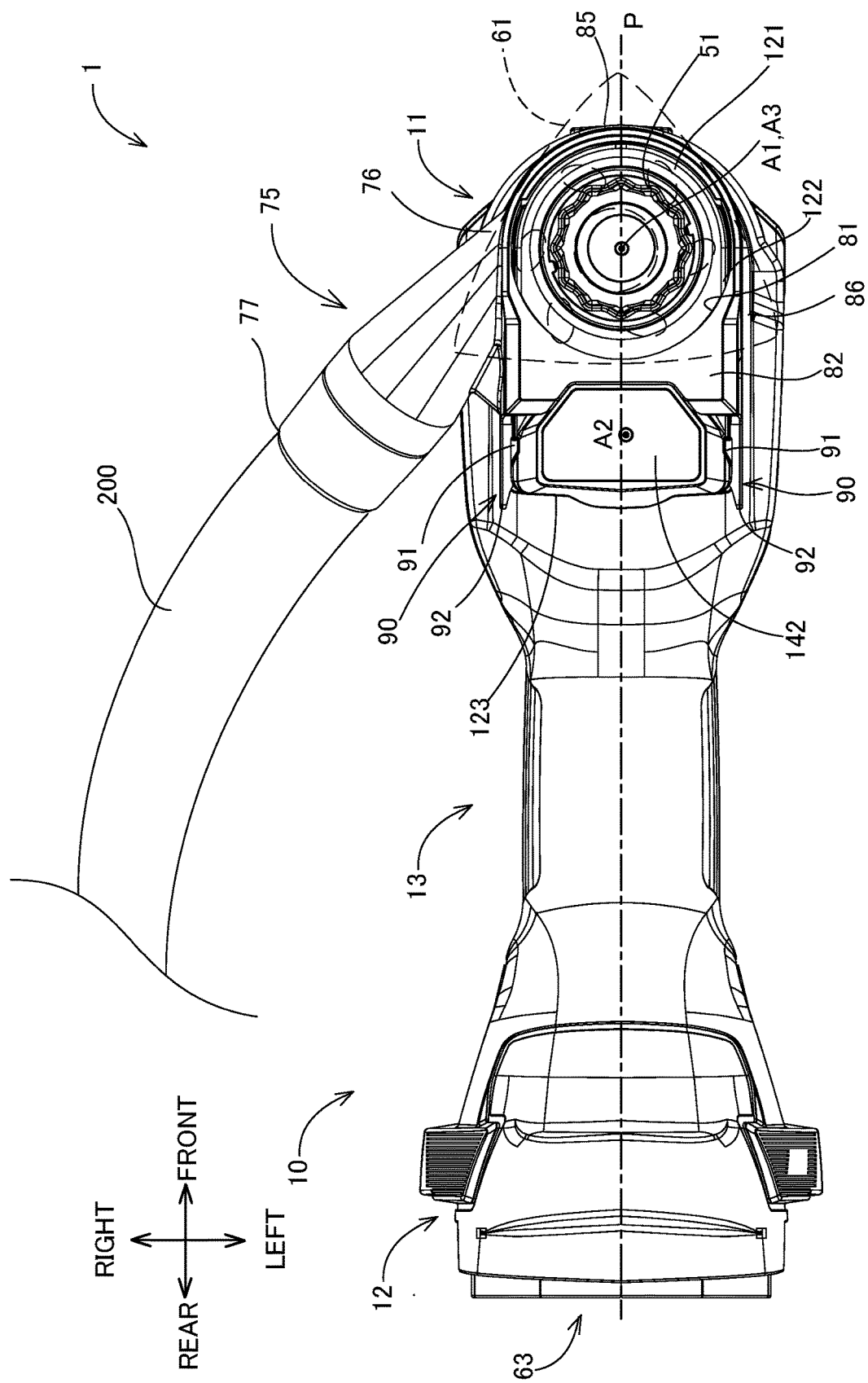
FIG. 14 is a bottom view illustrating the positional relation between the oscillating multi-tool with the dust collecting attachment attached thereto and a hose connected to the dust collecting attachment.

Referring to FIGS. 1 to 14, an oscillating tool (also referred to as an oscillating multi-tool) 1 and a dust collecting attachment 70 that is removably attachable to the oscillating multi-tool 1 according to an embodiment will be described. The oscillating multi-tool 1 is an example of a power tool that drives a tool accessory 61 to perform a processing operation on a workpiece. The oscillating multi-tool 1 shown in FIGS. 1, 2, and 14 is provided with a sanding pad as an example of the tool accessory 61. The sanding pad is a tool accessory for grinding and polishing a workpiece. In FIG. 14, the sanding pad is simplified and shown by broken lines.

Structure of Oscillating Multi-tool

Figure 3:
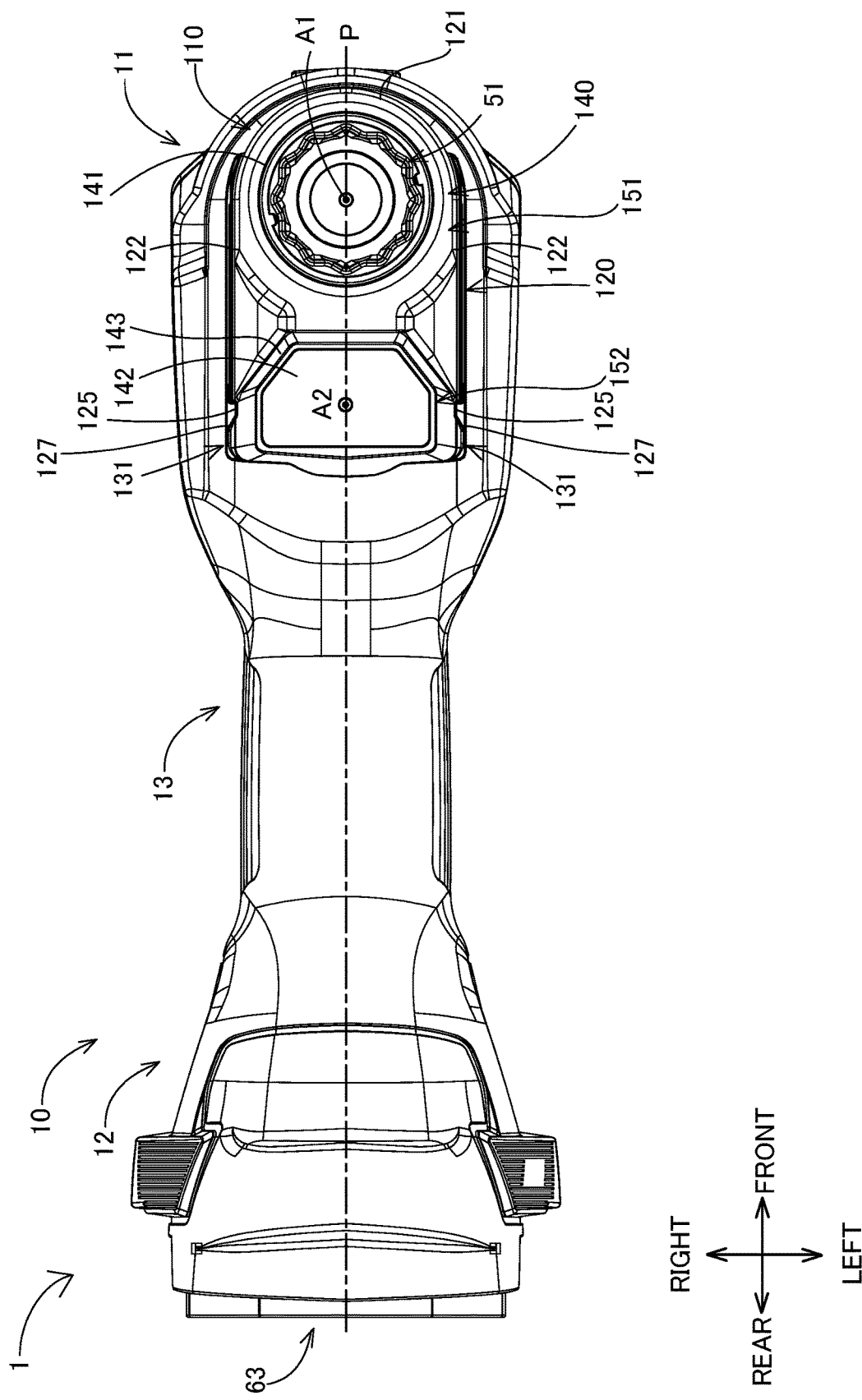
FIG. 3 is a bottom view of the oscillating multi-tool.

First, the general structure of the oscillating multi-tool 1 will be described. As shown in FIGS. 1 to 3, the oscillating multi-tool 1 includes an elongate housing 10. As shown in FIG. 2, an elongate spindle 5 and a motor 41, which serves as a drive source, are housed in one end portion of the housing 10 in its longitudinal direction. The spindle 5 is arranged so that its longitudinal axis intersects the longitudinal axis of the housing 10. In this embodiment, the longitudinal axis of the spindle 5 substantially orthogonally intersects the longitudinal axis of the housing 10. One (lower) axial end portion of the spindle 5 protrudes from the housing 10 and is exposed to the outside of the housing 10. The end portion forms a tool mounting part 51 to (on) which the tool accessory 61 can be attached and detached (removably mounted). The other end portion of the housing 10 in the longitudinal direction is configured such that a battery pack 64 for supplying power to the motor 41 can be removably mounted to (on) the other end portion. The oscillating multi-tool 1 is configured such that the spindle 5 is driven about the drive axis A1 with a rotary (pivotal) oscillating motion within a specified angle range, using power generated by the motor 41, to thereby oscillate the tool accessory 61.

In the following description, with respect to directions of the oscillating multi-tool 1, an extension direction of the drive axis A1 is defined as an up-down direction. In the up-down direction, the side on which the tool mounting part 51 of the spindle 5 is located is defined as a lower side, and the opposite side is defined as an upper side of the oscillating multi-tool 1. Further, a direction that is orthogonal to the drive axis A1 and that corresponds to the longitudinal direction of the housing 10 is defined as the front-rear direction of the oscillating multi-tool 1. In the front-rear direction, the side of one end portion of the housing 10 that houses the spindle 5 is defined as a front side, and the side of the other end portion to which the battery pack 64 is mounted is defined as the rear side of the oscillating multi-tool 1. Further, a direction that is orthogonal to both the up-down direction and the front-rear direction is defined as the left-right direction of the oscillating multi-tool 1. The left-right direction is also a width direction of the housing 10.

The detailed structure of the oscillating multi-tool 1 will be described below.

The housing 10 is configured as a so-called vibration-isolating housing. As shown in FIG. 2, the housing 10 includes an outer housing 2 and an inner housing 3. The outer housing 2 is an elongate body and forms an outer shell of the oscillating multi-tool 1. The inner housing 3 is an elongate body and is housed in the outer housing 2. The outer housing 2 and the inner housing 3 are elastically connected with each other. The housing 10 also includes, with respect to the front-rear direction, a front end part 11, a rear end part 12, and a central part 13 connecting the front end part 11 and the rear end part 12.

Figure 4:
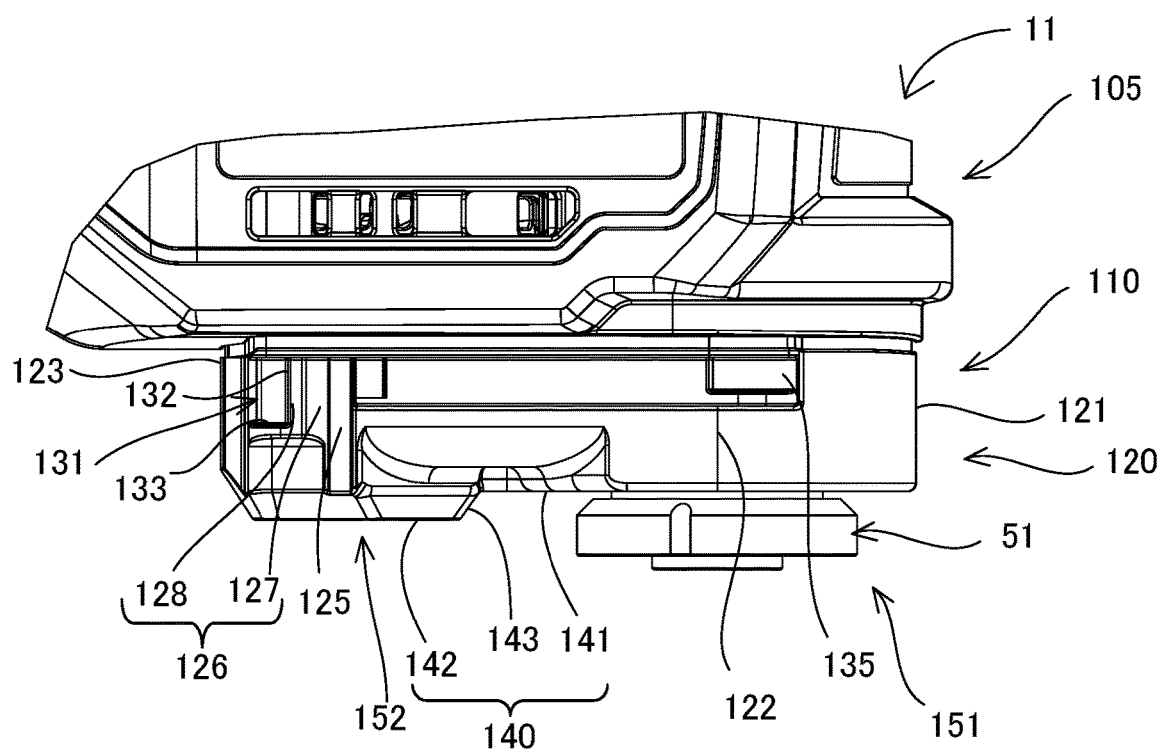
FIG. 4 a view illustrating a lower end part at the front end part of the housing.
Figure 4:
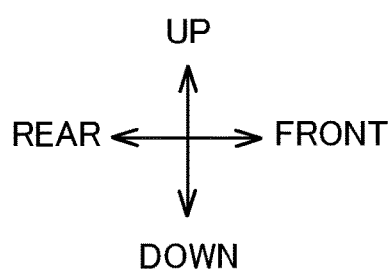
Figure 5:
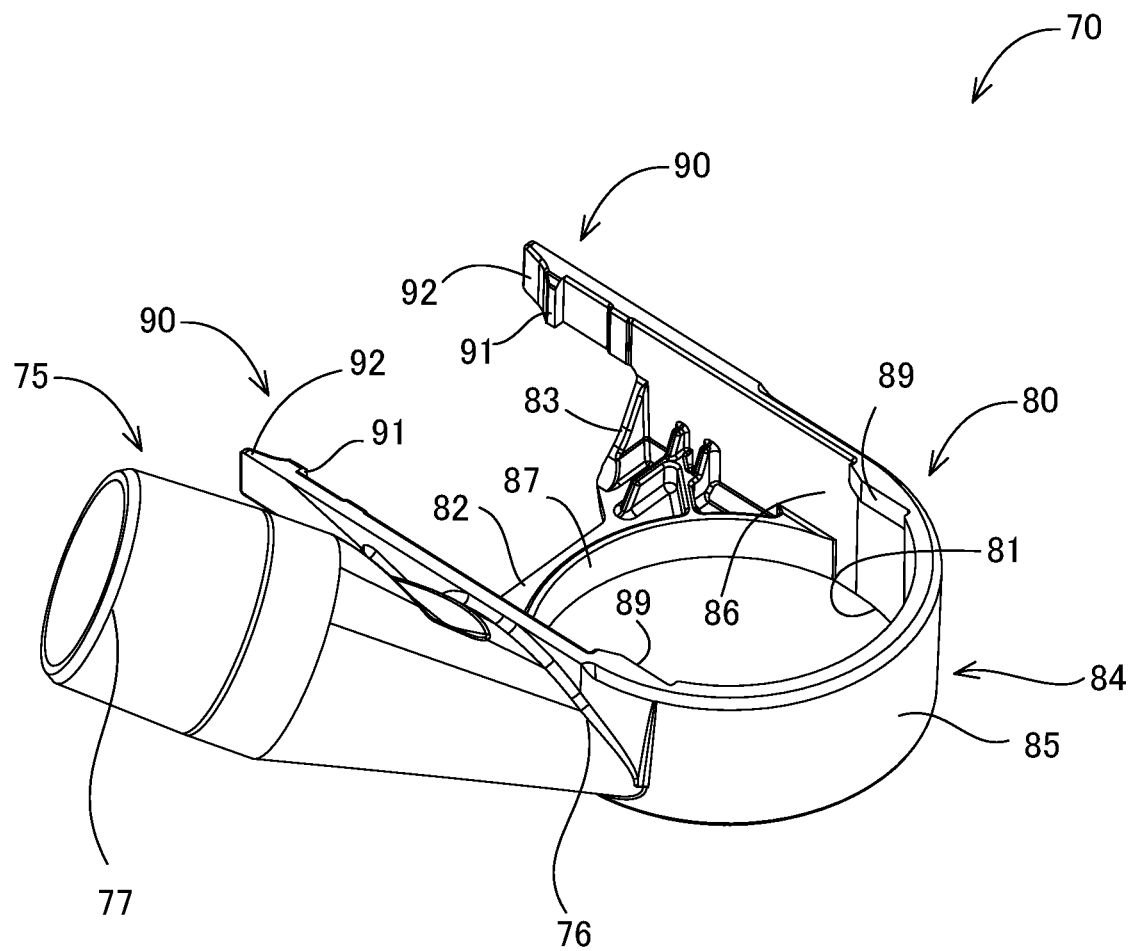
FIG. 5 is a perspective view of the dust collecting attachment.
Figure 5:
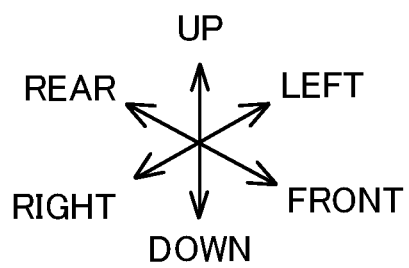
Figure 6:
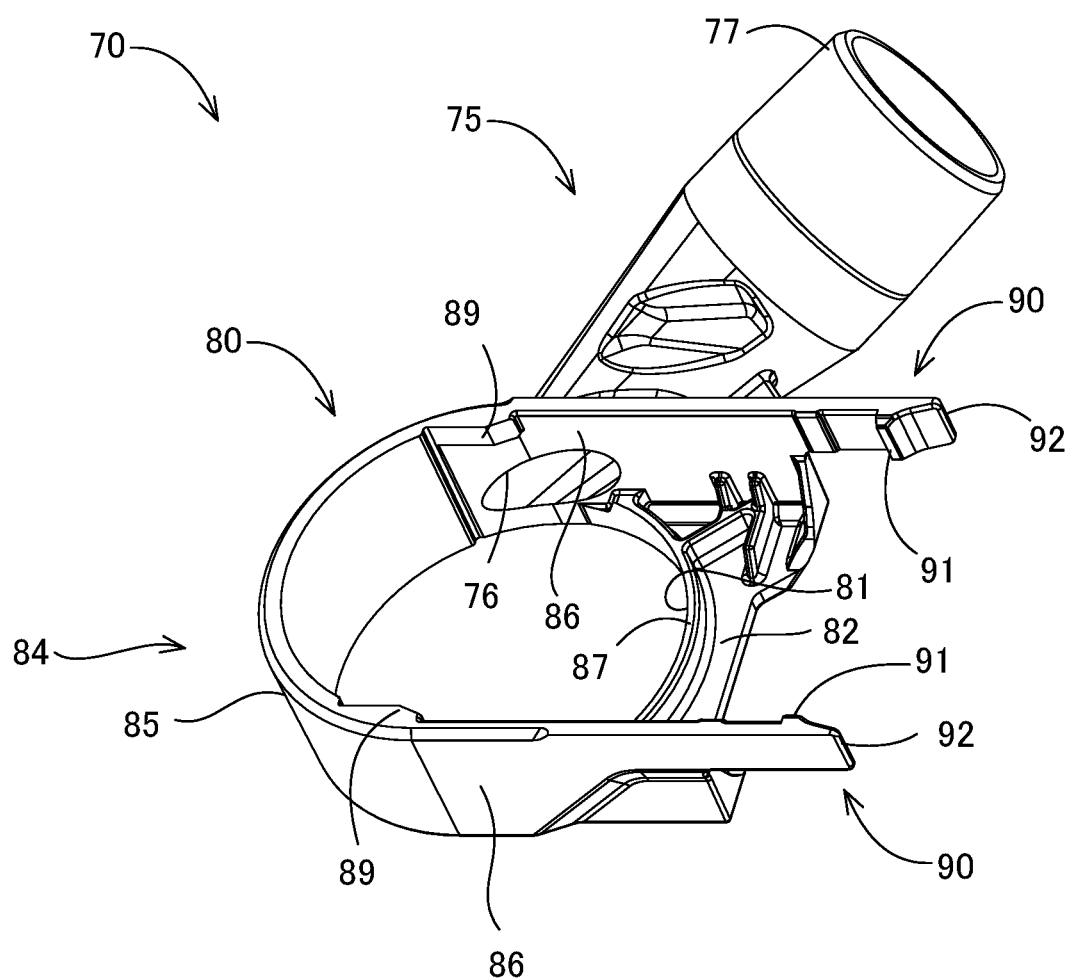
FIG. 6 is another perspective view of the dust collecting attachment.
Figure 6:
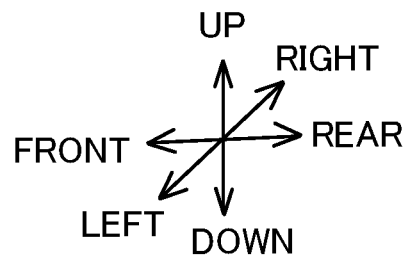
Figure 7:
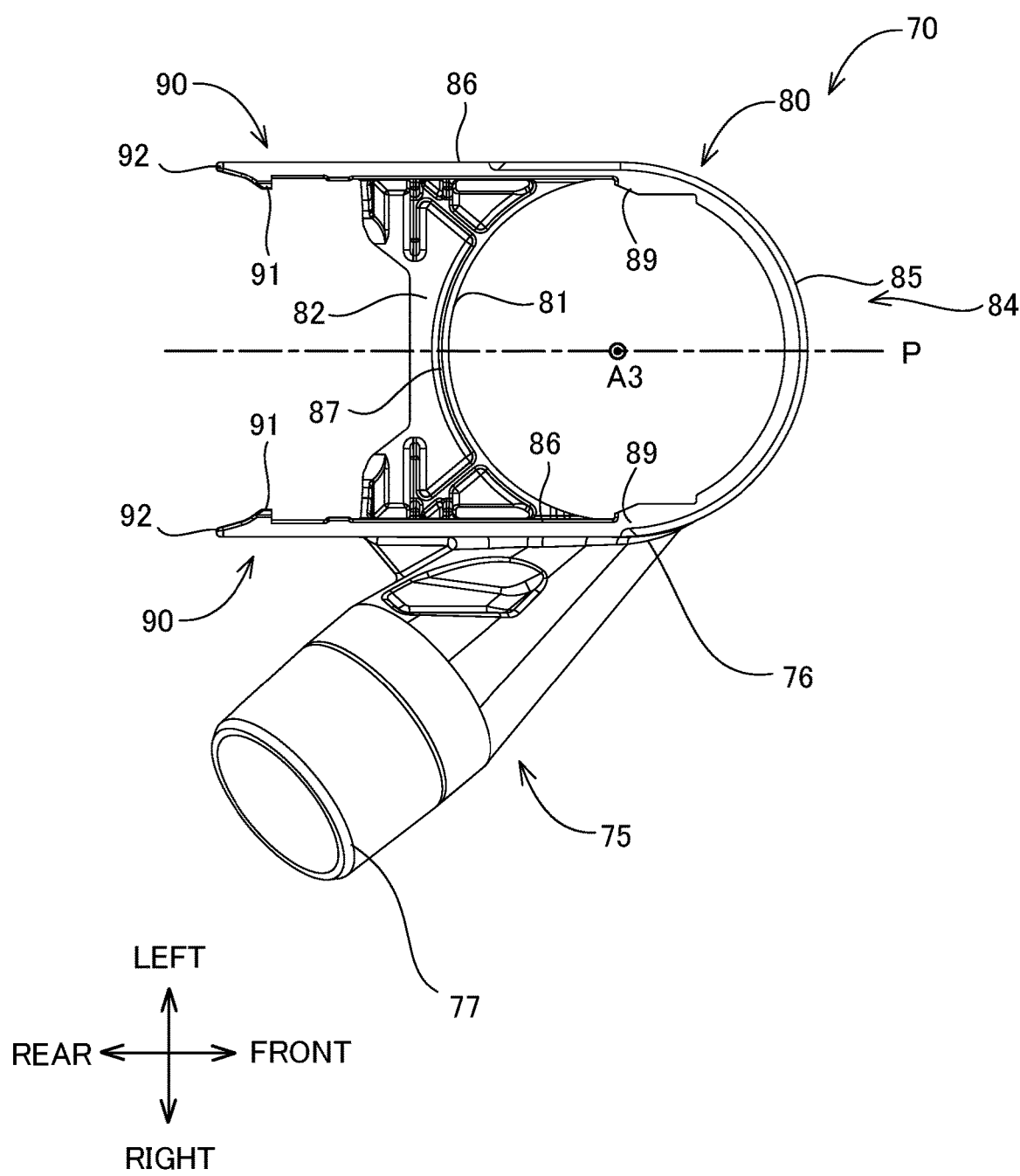
FIG. 7 is a top view of the dust collecting attachment.
Figure 8:
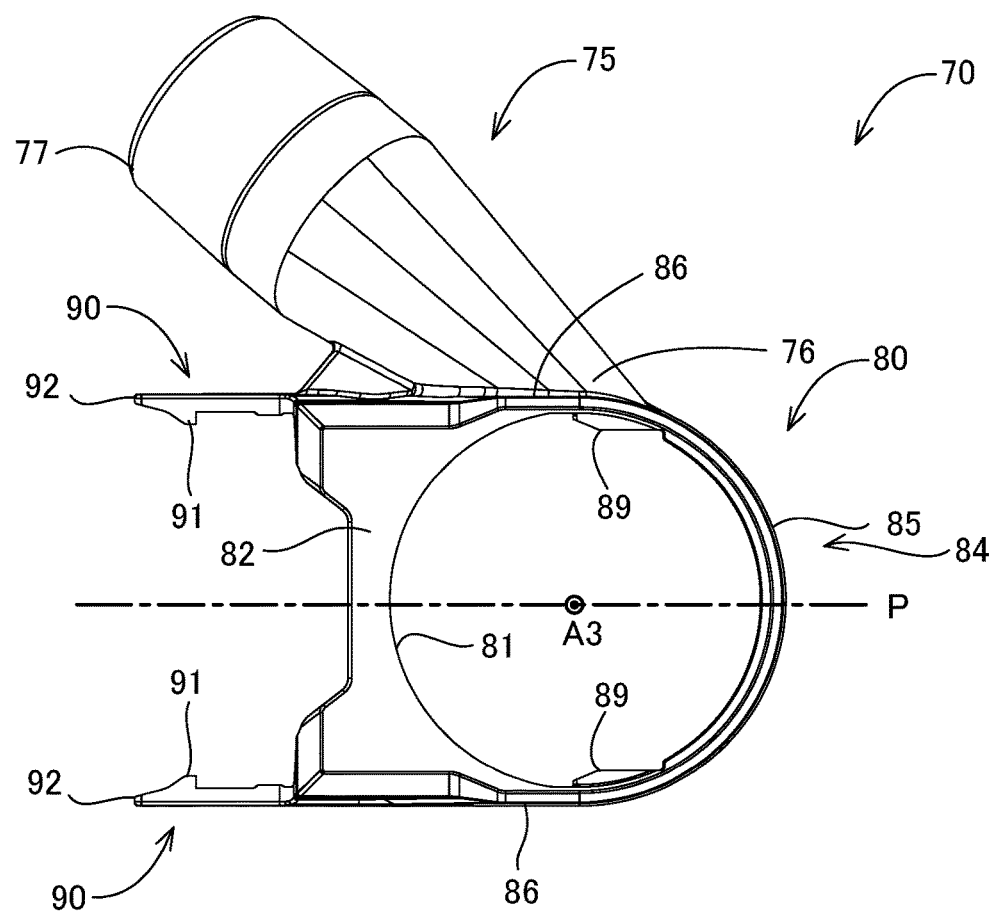
FIG. 8 is a bottom view of the dust collecting attachment.
Figure 8:
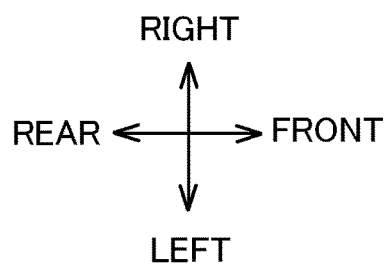
Figure 9:
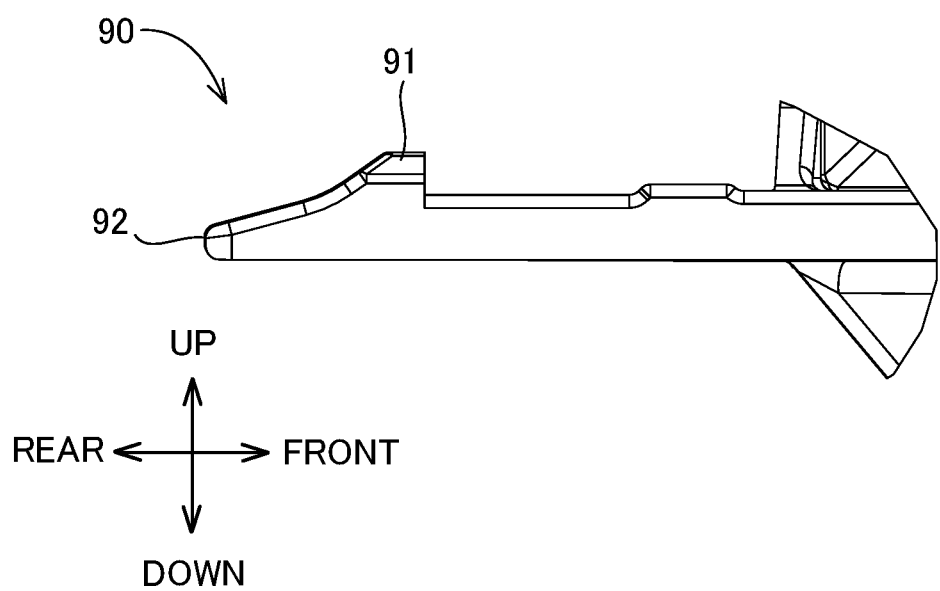
FIG. 9 is an enlarged view of an engagement piece.
Figure 10:
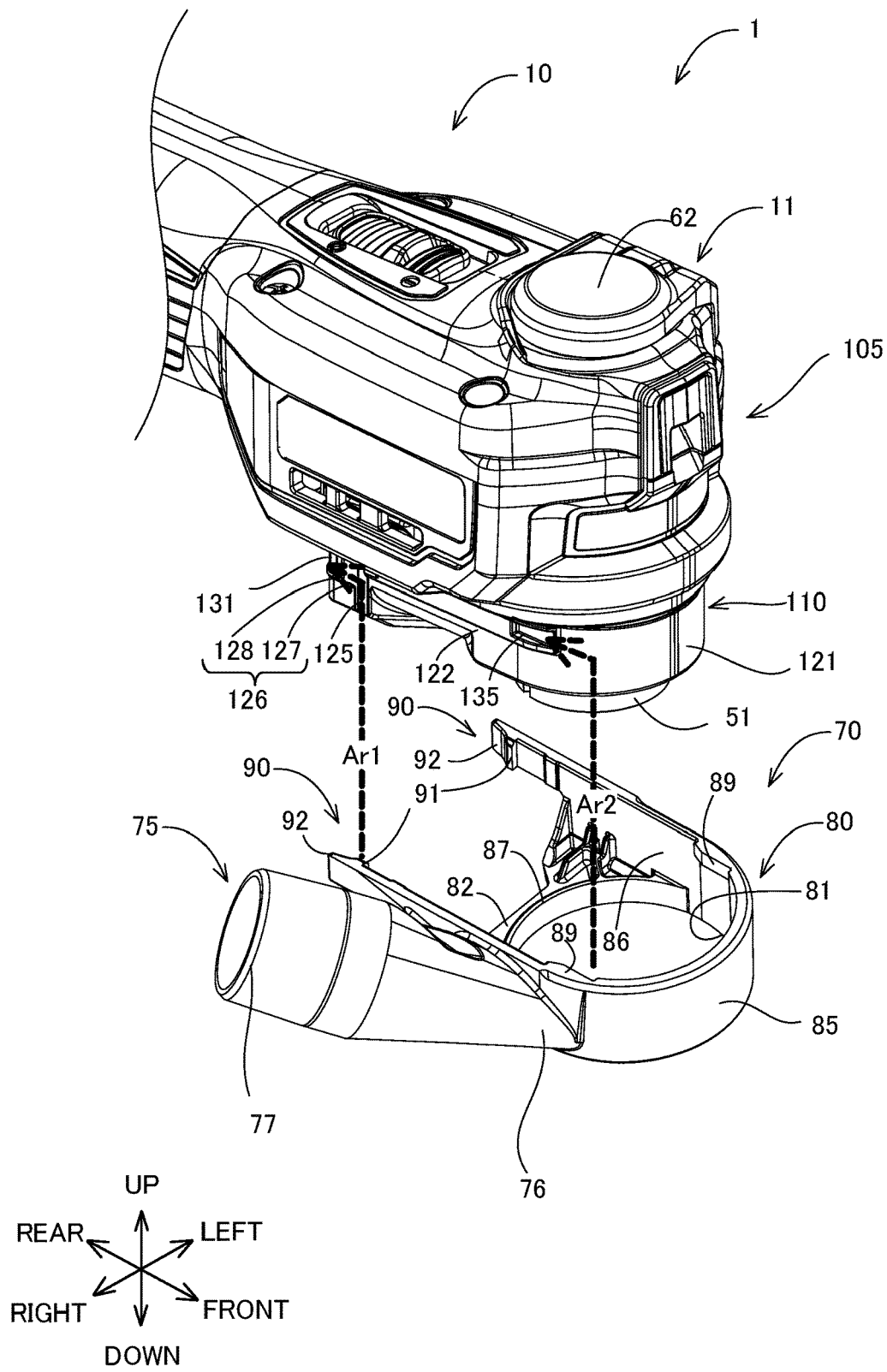
FIG. 10 is a view illustrating a method of attaching the dust collecting attachment to the oscillating multi-tool.
Figure 11:
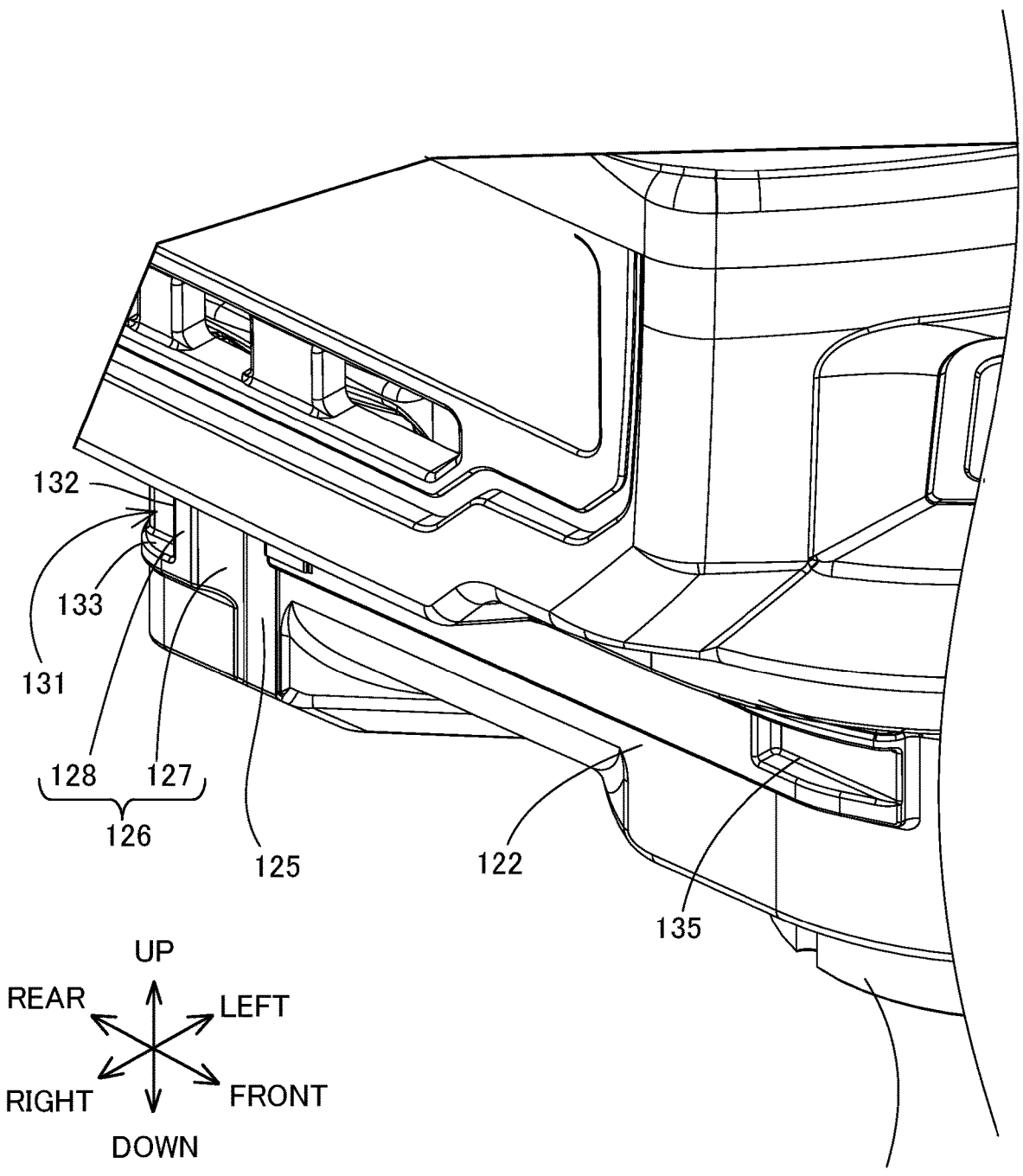
FIG. 11 is an enlarged perspective view of the lower end part of the housing.
Figure 12:
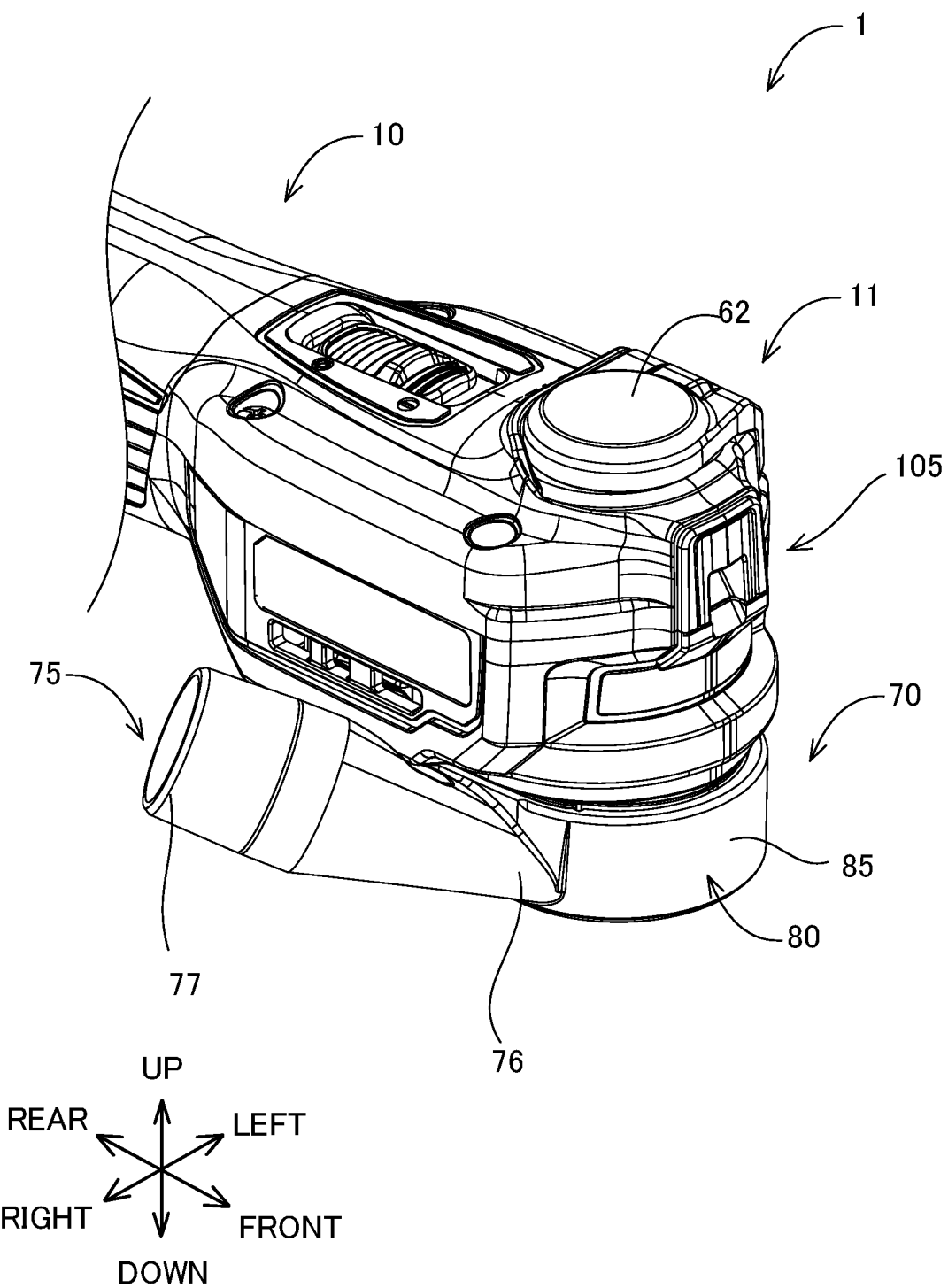
FIG. 12 is a perspective view illustrating the dust collecting attachment attached to the oscillating multi-tool.
Figure 13:
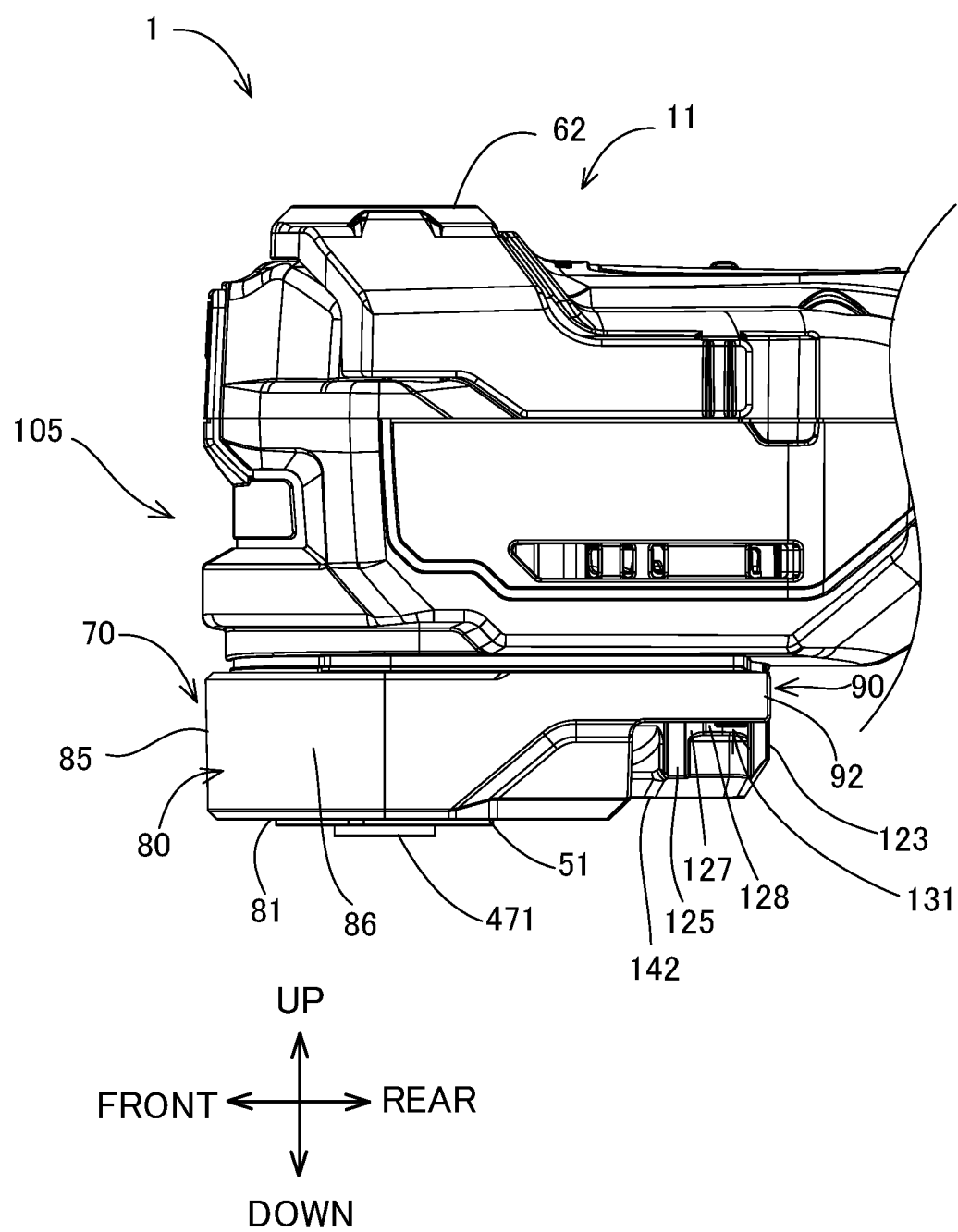
FIG. 13 is another view illustrating the dust collecting attachment attached to the oscillating multi-tool.

The front end part 11 (more specifically, the front end portion of the outer housing 2) is generally formed in a rectangular box-like shape. The front end part 11 includes a lower end part 110 and an upper part 105 above the lower end part 110. Although only the right side surface of the lower end part 110 of the front end part 11 is shown in FIG. 4, the left side surface of the lower end part 110 has the same structure as the right side surface. The lower end part 110 is a portion to (on) which the dust collecting attachment 70 is removably attached (mounted). The attaching (mounting) operation of the dust collecting attachment 70 will be described in detail later. In the present embodiment, the lower end part 110 has smaller dimensions in the left-right direction and in the front-rear direction than the upper part 105. The front end of the lower end part 110 is positioned rearward of the front end of the upper part 105. The length of the lower end part 110 in the left-right direction is shorter than the length of the upper part 105 in the left-right direction.

As shown in FIGS. 3 and 4, the lower end part 110 includes a peripheral (circumferential) wall 120 that is disposed around the drive axis A1, and a bottom part 140 connected to the peripheral wall 120 and extending substantially along the front-rear direction and the left-right direction. The lower end part 110 also includes a front part 151 provided with the tool mounting part 51 and a rear part 152 positioned rearward of the front part 151 in the front-rear direction. In the present embodiment, the lower end part 110 has a shape substantially symmetrical with respect to a virtual plane P that contains the drive axis A1 (see FIG. 3) and is perpendicular to the left-right direction.

The peripheral wall 120 includes an arc-shaped front wall 121 provided at the front end of the peripheral wall 120, a pair of left and right side walls 122 connected to the front wall 121 and extending rearward from the front wall 121, and a rear wall 123 connected to the side walls 122 and perpendicular to the front-rear direction. The side walls 122 of the lower end part 110 are longer in the up-down direction in the rear part 152 than in the front part 151. The side walls 122 protrude further downward in the rear part 152 than in the front part 151.

A groove 125 is formed on (in) each of the left and right side walls 122. The groove 125 is configured to guide a claw (hook, engagement protrusion/projection) 91, which will be described later in detail, of the dust collecting attachment 70 toward a predetermined attaching position. The groove 125 is formed on each of the side walls 122 in the rear part 152. The groove 125 extends from the lower end to the upper end of the side wall 122 in the up-down direction.

An engagement part 131 is provided rearward of (behind) each of the grooves 125. The engagement part 131 is a portion configured to engage and retain the claw 91 of the dust collecting attachment 70. In the present embodiment, the engagement part 131 is a recess on (in) the side wall 122, and is defined by a front surface 132 and a lower surface 133.

In this embodiment, a connecting part 126 is provided between the groove 125 and the engagement part 131. The connecting part 126 includes an inclined surface 127 inclined in a direction away from the plane P (see FIG. 3) toward the rear, and a flat surface 128 connecting the inclined surface 127 and the engagement part 131 (front surface 132).

A recess 135 is provided at a connecting portion between the front wall 121 and each of the side walls 122. The recess 135 is configured to engage and retain a protrusion 89, which will be described later in detail, of the dust collecting attachment 70. In the present embodiment, the front end of the recess 135 is open so as to receive the protrusion 89 from the front.

The bottom part 140 includes a first lower surface 141 corresponding to the front part 151, a second lower surface 142 corresponding to the rear part 152, and an inclined surface 143 connecting the first lower surface 141 and the second lower surface 142. The second lower surface 142 is located downward of the first lower surface 141 in the up-down direction. The inclined surface 143 is a surface inclined downward from the front toward the rear.

As shown in FIG. 2, the front end part 11 (more specifically, the front end part 11 of the inner housing 3) houses the spindle 5, the motor 41, a transmission mechanism 45, and a clamp mechanism 47.

The spindle 5 is a substantially cylindrical elongate member that is rotatable about the drive axis A1. The spindle 5 is housed in the front end part 11 of the housing 10. The spindle 5 is supported to be pivotable or rotatable about the drive axis A1 by bearings. As described above, the lower end portion of the spindle 5 protrudes downward from the front end part 11 of the housing 10 and defines the tool mounting part 51, to which the tool accessory 61 can be attached. In this embodiment, the tool mounting part 51 is shaped like a flange that protrudes radially outward with respect to the drive axis A1.

The motor 41 includes a stator, a rotor, and an output shaft 411. The motor 41 is housed behind the spindle 5 in the housing 10. In the present embodiment, the rotational axis A2 of the output shaft 411 is located directly behind the drive axis A1 of the spindle 5 and extends in parallel with the drive axis A1.

The transmission mechanism 45 is a known mechanism configured to receive (input) the rotary motion of the output shaft 411 and to convert the rotary motion to cause the spindle 5 pivotally oscillate within a specified angle range around the drive axis A1.

The clamping mechanism 47 is a mechanism configured to fix (secure) the tool accessory 61 to the tool mounting part 51 using the clamping shaft 471, such that the tool accessory 61 pivots (oscillates) together with the spindle 5. The upper part 105 of the front end part 11 is provided with a lever 62 pivotable (rotatable) about the drive axis A1. A user can actuate the clamping mechanism 47 by manually operating the lever 62 to fix the tool accessory 61 to the tool mounting part 51 or to release the fixing.

The rear end part 12 (more specifically, the rear end part of the outer housing 2) is a tubular portion whose cross-sectional area increases toward the rear. A battery mounting part 63 is provided in a rear part of the rear end part 12. The battery mounting part 63 is slidably engageable with and electrically connectable to the battery pack 64 (see FIG. 1).

The central part 13 (more specifically, the central part of the outer housing 2) is a tubular portion having a generally uniform outer diameter and extends in the front-rear direction. The central part 13 forms a grip part which can be gripped by a user. The central part 13 is formed thinner than the front end part 11 and the rear end part 12.

Structure of Dust Collecting Attachment

Next, the dust collecting attachment 70 will be described. The dust collecting attachment 70 is configured to collect dust generated during a processing operation performed on a workpiece by the oscillating multi-tool 1. The dust collecting attachment 70 is removably attachable to (mountable on) the housing 10. In this embodiment, the dust collecting attachment 70 is removably attached to (mounted on) the lower end part 110 of the front end part 11 of the housing 10.

As shown in FIGS. 5 to 8, the dust collecting attachment 70 includes: a covering part 80 having a suction hole 81; a discharging part 75 configured to discharge dust from the inside of the covering part 80; and engagement pieces 90 each having the claw 91 configured to engage the dust collecting attachment 70 with the housing 10. In this embodiment, the covering part 80, the discharging part 75, and the engagement pieces 90 are formed of a single (integral) member. The dust collecting attachment 70 may be formed of, for example, synthetic resin (polymer) or metal.

In the following description, directions with regard to the dust collecting attachment 70 are defined based on the directions in an attached state in which the dust collecting attachment 70 is attached to the oscillating multi-tool 1. The dust collecting attachment 70 is attached to the housing 10 such that the drive axis A1 passes through the suction hole 81. In this attached state, the covering part 80 is arranged at the front in the front-rear direction, and the engagement pieces 90 are arranged rearward of the covering part 80.

The detailed structure of each part of the dust collecting attachment 70 will be described below.

The covering part 80 is configured to cover at least a portion of the periphery (circumference) of the tool mounting part 51. In this embodiment, as shown in FIG. 2, the covering part 80 covers (surrounds, encircles) the entire periphery of the tool mounting part 51. The covering part 80 includes a bottom part 82 having the suction hole 81, and a peripheral (circumferential) wall 84 connected to the bottom part 82 and extending in the up-down direction. The bottom part 82 extends generally along the front-rear direction and the left-right direction (i.e., extends generally perpendicular to the up-down direction). The suction hole 81 is a substantially circular hole. The diameter of the suction hole 81 is larger than the outer diameter of the tool mounting part 51. The suction hole 81 is disposed in the bottom part 82 such that the drive axis A1 passes through the suction hole 81 in the attached state. In the present embodiment, in the attached state, the drive axis A1 substantially passes through the center of the suction hole 81. In other words, the dust collecting attachment 70 is attached to the oscillating multi-tool 1 such that the central axis A3 of the suction hole 81 and the drive axis A1 substantially coincide with each other (see FIG. 14).

The peripheral wall 84 includes a front wall 85 provided at the front and a pair of left and right side walls 86 connected to the front wall 85 and extending rearward from the front wall 85. The front wall 85 is an arc-shaped portion along the suction hole 81. The cross-sectional shape perpendicular to the up-down direction of the front wall 85 is a substantially circular arc shape. Therefore, the peripheral wall 84 as a whole has a substantially U-shaped cross-section perpendicular to the up-down direction.

In this embodiment, the covering part 80 further includes a rib 87. The rib 87 is a wall part that faces the front wall 85 across the suction hole 81, and that extends along the suction hole 81. The left and right ends of the rib 87 are connected to the left and right side walls 86, respectively. The length of the rib 87 in the up-down direction is shorter than that of the front wall 85. The rib 87 is formed such that an upper end of the rib 87 substantially abuts on the first lower surface 141 of the housing 10 in the attached state.

The discharging part 75 is configured to discharge dust from the inside (internal space) of the covering part 80. In this embodiment, the discharging part 75 is a tubular member. The discharging part 75 has a first end part 76 connected to the covering part 80 and a second end part 77 that is an end part opposite to the first end part 76. In this embodiment, the first end part 76 is connected to the right side wall 86. The first end part 76 communicatively connects the inside (internal space) of the covering part 80 with the inside (internal space) of the discharging part 75 through an opening formed through the right side wall 86. The second end part 77 can be connected to a tubular member (pipe) such as, for example, a hose. The discharging part 75 can be operatively connected (coupled) to a suction device such as a vacuum cleaner via the tubular member.

In the present embodiment, the discharging part 75 as a whole is formed in a generally conical cylindrical shape in which the inner diameter of the second end part 77 is larger than the inner diameter of the first end part 76. The discharging part 75 is formed so as to extend from the right side wall 86 to the rear right and upward.

Each of the engagement pieces 90 is an elastically deformable (flexible) portion connected to the covering part 80. In this embodiment, the engagement piece 90 is formed as an elongate strip (a thin plate). The dust collecting attachment 70 includes two engagement pieces 90 that are respectively connected to the left and right side walls 86. The engagement pieces 90 extend rearward from the rear ends of the side walls 86, respectively. The two engagement pieces 90 face each other across the virtual plane P that contains the central axis A3 (drive axis A1) of the suction hole 81 and that is perpendicular to the left-right direction. The distance in the left-right direction between the two engagement pieces 90 is approximately equal to or only slightly larger than the width of the lower end part 110 of the oscillating multi-tool 1. The two engagement pieces 90 can be elastically deformed (deflected, bent) in the direction in which the two engagement pieces 90 face each other (i.e., in the left-right direction). In the present embodiment, each of the engagement pieces 90 and the covering part 80 have a thickness such that it does not protrude in the front-rear direction and the left-right direction from the upper part 105 of the housing 10 in the attached state.

Each of the engagement pieces 90 is provided with the claw 91 and a tab 92. The claw 91 is a protrusion (projection) configured to engage with the housing 10 to thereby engage the dust collecting attachment 70 with the housing 10. In the present embodiment, the claw 91 is provided on the rear part of the engagement piece 90. In the present embodiment, the claw 91 provided on the right one of the two engagement pieces 90 protrudes leftward, and the claw 91 provided on the left one of the two engagement pieces 90 protrudes rightward. In other words, the two claws 91 protrude toward the peripheral wall 120 of the housing 10 in the attached state. Further, the claws 91 face each other across the plane P (see FIG. 7).

The tab 92 is a portion extending in a direction other than the protruding direction of the claw 91. The tab 92 has a shape suitable for a user to pinch (hold with fingers). In this embodiment, the tab 92 is provided at the rear end of the engagement piece 90. The tab 92 extends rearward of the claw 91 such that the rear end of the tab 92 is positioned behind the rear wall 123 in the attached state. The tabs 92 face each other across the plane P.

The dust collecting attachment 70 of the present embodiment further includes a pair of (two) protrusions (projections) 89. Each of the protrusions 89 is configured to engage with the housing 10 at a position that is different from the predetermined position at which the claw 91 engages with the housing 10. In the present embodiment, the two protrusions 89 are provided at a left connecting portion between the front wall 85 of the covering part 80 and the left side wall 86 and at a right connecting portion between the front wall 85 and the right side wall 86, respectively. The protrusion 89 is a portion where the connecting portion protrudes inward of the covering part 80. The protrusions 89 face each other across the plane P (see FIG. 7). The protrusions 89 are configured to engage with the recesses 135, respectively, when the claws 91 of the engagement pieces 90 engage with the engagement parts 131, respectively.

Method for Attaching/detaching Dust Collecting Attachment

With reference to FIGS. 10 to 14, a method of attaching (mounting) the dust collecting attachment 70 to (on) the oscillating multi-tool 1 and a method of detaching (removing) the dust collecting attachment 70 from the oscillating multi-tool 1 will be described.

When attaching the dust collecting attachment 70 to the oscillating multi-tool 1, a user first arranges (positions, places) the dust collecting attachment 70 below the lower end part 110 of the housing 10. As shown by the broken line arrow Ar1 in FIG. 10, the user moves the claws 91 upward along (in) the groove 125, and then moves them rearward along the inclined surfaces 127. Each of the engagement pieces 90 elastically deforms in a direction away from the plane P (see FIG. 7) when moving rearward along the inclined surface 127. Then, the claw 91 climbs over the flat surface 128, reaches the engagement part 131, so that the claw 91 engages with (fits in) the engagement part 131. In the present embodiment, the forward movement of the claw 91 is restricted (blocked) by the front surface 132 defining the engagement part 131. The downward movement of the claw 91 is also restricted (blocked) by the lower surface 133 defining the engagement part 131 (see FIG. 11).

When the claws 91 engage with the engagement parts 131 of the housing 10, respectively, the protrusions 89 of the covering part 80 engage with the recesses 135 of the housing 10, respectively. More specifically, when the claws 91 move upward along (in) the corresponding grooves 125, the protrusions 89 move upward as indicated by the broken line arrow Ar2 in FIG. 10, and are positioned in front of the recesses 135, respectively. Subsequently, when the claws 91 move rearward along the inclined surfaces 127, respectively, each of the protrusions 89 moves to the corresponding recess 135 provided near the connecting portion between the front wall 121 and the side wall 122. When the claws 91 climb over the flat surfaces 128 and engage with the engagement parts 131, respectively, the protrusions 89 engage with the recesses 135, respectively.

At this time, the front wall 85 of the covering part 80 abuts on the front wall 121 of the lower end part 110 of the housing 10. The left and right side walls 86 of the covering part 80 abut on the left and right side walls 122 of the lower end part 110 (see FIG. 14), respectively. Further, the rib 87 of the covering part 80 abuts on the first lower surface 141 of the lower end part 110 behind the tool mounting part 51. In this way, when the claws 91 engage the engagement parts 131, the periphery of the tool mounting part 51 is covered with the covering part 80.

After attaching the dust collecting attachment 70 to the housing 10, the user can attach the tool accessory 61 to the tool mounting part 51 and attach, for example, a hose 200 to the second end part 77 (see FIG. 14). As described above, the discharging part 75 extends from the right side wall 86 to the rear right and upward. Therefore, the hose 200 connected to the discharging part 75 extends in a direction away from the central part 13 of the oscillating tool 1. When the suction device connected to the hose 200 is activated, the dust generated during the processing operation performed by the oscillating multi-tool 1 is sucked through the suction hole 81 into the covering part 80 and sucked (discharged) to the outside of the dust collecting attachment 70 through the discharging part 75.

When detaching (removing) the dust collecting attachment 70 from the housing 10, the user removes the tool accessory 61 from the tool mounting part 51 and then pulls the rear end parts of the engagement pieces 90 away from the housing 10 in the left-right direction. Thus, the engagement pieces 90 are elastically deformed, and the claws 91 can be disengaged (removed, separated) from the corresponding engagement parts 131 of the housing 10. In this embodiment, the user can disengage the claws 91 from the engagement parts 131 by pinching and pulling the tabs 92 away from the housing 10 in the left-right direction (in the direction away from the plane P). Thereafter, by moving the claws 91 along (in) the corresponding grooves 125, the dust collecting attachment 70 can be removed from the housing 10.

ADVANTAGES

The dust collecting attachment 70 and the oscillating multi-tool 1 of the present embodiment described above provide the following advantages.

(A1) The dust collecting attachment 70 of this embodiment includes the covering part 80 having the suction hole 81 and the engagement pieces 90 respectively connected to the covering part 80. The engagement pieces 90 are each configured to be elastically deformable. Each of the engagement pieces 90 has the claw 91 configured to engage with the housing 10 at a predetermined position of the housing 10. Therefore, the dust collecting attachment 70 can be attached to (mounted on) the oscillating multi-tool 1 by engagement between the claws 91 provided on the engagement pieces 90 and the housing 10 at predetermined positions of the housing 10. Thus, according to the present embodiment, it is possible to provide the novel dust collecting attachment 70 which can be easily attached to the oscillating multi-tool 1.

(A2) The engagement pieces 90 extend in a direction that intersects the drive axis A1 of the spindle 5 in the attached state. Therefore, the user can engage the dust collecting attachment 70 with the oscillating multi-tool 1 at the predetermined position of the housing 10 in the direction that intersects the drive axis A1.

(A3) The engagement pieces 90 extend in the extending direction (front-rear direction) of the housing 10 in the attached state. Therefore, the user can engage the dust collecting attachment 70 with the oscillating multi-tool 1 at the predetermined position of the housing 10 in the front-rear direction while moving the engagement pieces 90 along the housing 10 in the front-rear direction.

(A4) The front end of each of the engagement pieces 90 is connected to the covering part 80, and in the attached state, the claw 91 is provided on the rear part of each of the engagement pieces 90 in the front-rear direction. Therefore, the user can engage the dust collecting attachment 70 with the oscillating multi-tool 1 on the rear part of the front end part 11 of the housing 10.

(A5) The dust collecting attachment 70 includes the pair of (two) engagement pieces 90, and the pair of engagement pieces 90 face each other across the plane P in the attached state. Therefore, the dust collecting attachment 70 can be attached to the oscillating multi-tool 1 by engagement between the two engagement pieces 90 and the housing 10 at two positions located on opposite sides of the plane P, thereby stabilizing the attached state of the dust collecting attachment 70 to the oscillating multi-tool 1.

(A6) The discharging part 75 extends in the direction that intersects the front-rear direction, which is the extending direction of the housing 10. Such a configuration can reduce the possibility that the discharging part 75 itself and a hose or a suction device operatively connected to the second end part 77 of the discharging part 75 interfere with the oscillating multi-tool 1 in use.

(A7) The dust collecting attachment 70 is formed of a single (integral) member. Therefore, the dust collecting attachment 70 can be attached to the oscillating multi-tool 1 only by engaging the claws 91 with the engagement parts 131. Therefore, as compared with a structure in which the dust collecting attachment 70 is formed of a plurality of separate members, the user can more easily attach the dust collecting attachment 70 to the oscillating multi-tool 1.

(A8) Each of the engagement pieces 90 includes a tab 92. The tab 92 extends in a direction that is different from a direction in which the claw 91 protrudes from the engagement piece 90. Therefore, the user can disengage (remove) the claws 91 from the housing 10 by pinching and pulling the tabs 92 away from the housing 10 to elastically deform the engagement pieces 90. Consequently, the user can easily remove (detach) the dust collecting attachment 70 from the oscillating multi-tool 1.

(A9) The tabs 92 are disposed rearward of the claws 91, respectively, and protrude rearward. The rear ends of the tabs 92 are positioned behind the rear wall 123 of the housing 10 in the attached state. Therefore, the user can easily pinch the tabs 92. Further, since the tabs 92 protrude rearward in the attached state, it can reduce the possibility that the tabs 92 interfere with oscillating multi-tool 1 in use.

(A10) The covering part 80 further includes the pair of (two) protrusions 89. The protrusions 89 each protrude toward the plane P in the attached state. The protrusions 89 are configured to be engaged with the housing 10 at respective positions that are different from the predetermined positions at which the claws 91 respectively engage with the housing 10. Therefore, it is possible to further stabilize the attached state of the dust collecting attachment 70 to the oscillating multi-tool 1 as compared with a structure in which the covering part 80 does not include the protrusions 89.

(A11) In this embodiment, the front ends of the engagement pieces 90 are respectively connected to the covering part 80, and the claws 91 are respectively provided on the rear parts of the engagement pieces 90 in the front-rear direction. Further, the protrusions 89 each protrude toward the plane P at the front part of the covering part 80. Therefore, the front part and the rear part of the dust collecting attachment 70 are respectively engaged with the housing 10 via the protrusions 89 and the claws 91. Therefore, it is possible to further stabilize the attached state of the dust collecting attachment 70 to the oscillating multi-tool 1.

(A12) In this embodiment, the housing 10 of the oscillating multi-tool 1 includes the engagement parts 131 configured to be engaged with the claws 91, respectively, and the grooves 125 configured to guide the claws 91 toward the corresponding engagement parts 131, respectively. Therefore, the user can move the claws 91 along (in) the corresponding grooves 125 to engage the claws 91 with the engagement parts 131 of the housing 10, respectively. Therefore, the dust collecting attachment 70 can be more easily attached to the oscillating multi-tool 1 as compared with a structure in which the covering part 80 does not include the grooves 125.

(A13) In the present embodiment, each of the engagement parts 131 is disposed rearward of the groove 125, and is configured as a recess on the side wall 122 of the housing 10. Each of the grooves 125 is formed on the side wall 122 of the housing 10 and extends in the up-down direction. Further, the housing 10 is provided with the inclined surfaces 127 inclined from the grooves 125 toward the engagement parts 131 in a direction away from the plane P, respectively. Therefore, when the user moves the claws 91 along the grooves 125 upward and then moving the claws 91 along the inclined surfaces 127, the engagement pieces 90 are elastically deformed while moving, and the claws 91 engage with the protrusions (engagement parts 131) provided rearward of the inclined surfaces 127, respectively. Therefore, the user can more easily attach the dust collecting attachment 70 to the oscillating multi-tool 1.

(A14) The housing 10 has the recesses 135 provided at positions that are different from the engagement parts 131. The recesses 135 are configured such that when the claws 91 are engaged with the engagement parts 131, respectively, the protrusions 89 provided on the covering part 80 are engaged with the recesses 135, respectively. Therefore, it is possible to further stabilize the attached state of the dust collecting attachment 70 to the oscillating multi-tool 1 as compared with a structure in which the housing 10 is not provided with the recesses 135.

(A15) In the oscillating multi-tool 1, the motor 41 and the spindle 5 are housed in the front end part 11 of the housing 10. Therefore, the front end part 11 can be made larger as compared with the structure in which the motor 41 is housed in a portion other than the front end part 11 of the housing 10. Therefore, the dust collecting attachment 70 can be easily attached to the relatively large front end part 11 of the oscillating multi-tool 1, and other portions of the housing 10 can be formed small. For example, since the central part 13 can be formed thin, the dust collecting attachment 70 can be formed into a shape that is easy to be held by a user. Further, since the output shaft 411 of the motor 41 is located directly behind the drive axis A1 of the spindle 5 and extends in parallel with the drive axis A1, the front end part 11 is not made too large, as compared with, for example, the structure in which the output shaft 411 intersects the drive axis A1. Therefore, it is possible to provide the oscillating multi-tool 1 to which the dust collecting attachment 70 is easily attached and having good operability.

(A16) The lower end part 110 of the front end part 11 of the housing 10 has smaller dimensions in the left-right direction and in the front-rear direction than the upper part 105. In addition, each of the covering part 80 and the engagement piece 90 has a thickness such that it does not protrude in the front-rear direction and the left-right direction from the upper part 105 in the attached state. Therefore, the dust collecting attachment 70 can reduce the possibility of interfering with the oscillating multi-tool 1 in use. Further it is possible to improve the design of the oscillating multi-tool 1 with the dust collecting attachment 70 attached thereto.

CORRESPONDENCES

Correspondences between the features of the above embodiments and the features of the present disclosure will be described below.

The oscillating multi-tool 1 is an example of the "power tool". The tool accessory 61 is an example of the "tool accessory". The housing 10 (outer housing 2) and the front end part 11 are examples of the "housing" and the "front end part". The tool mounting part 51 and the spindle 5 are examples of the "tool mounting part" and the "spindle". The drive axis A1 is an example of the "drive axis". The motor 41 and the output shaft 411 are examples of the "motor" and the "output shaft". The groove 125, the connecting part 126, the inclined surface 127, and the flat surface 128 are examples of the "guiding part", respectively. The engagement part 131 is an example of the "engagement part". The recess 135 is an example of the "second recess or second protrusion". The plane P is an example of the "plane including the drive axis". The side wall 122 is an example of the "side wall of the housing".

The dust collecting attachment 70 is an example of the "dust collecting attachment". The covering part 80 is an example of the "covering part". The suction hole 81 is an example of the "suction hole". The discharging part 75 is an example of the "discharging part". The first end part 76 and the second end part 77 are examples of the "first end part" and the "second end part". The engagement piece 90 is an example of the "at least one engagement piece". The claw 91 and the tab 92 are examples of the "claw" and the "tab", respectively. The protrusion 89 is an example of the "first protrusion or first recess". The bottom part 82 is an example of the "bottom part". The peripheral wall 84 is an example of the "peripheral wall". The front wall 85 is an example of the "first wall", and the side wall 86 is an example of the "second wall".

OTHER EMBODIMENTS

In the above embodiment, the number of the engagement pieces 90 provided in the dust collecting attachment 70 may be one or may be three or more.

In the dust collecting attachment 70, the extending direction of the engagement piece 90 may be another direction. For example, the engagement piece 90 may be connected to the front end of the side wall 86 of the covering part 80 and may extend forward. In this case, the claw 91 may be configured to engage with the housing 10 in the vicinity of the front end of the lower end part 110 of the housing 10. Further, the engagement piece 90 may extend in, for example, the up-down direction. In this case, an engagement part configured to engage with and retain the claw 91 may be provided on the upper part 105 of the housing 10. Alternatively, the engagement piece 90 may extend in the left-right direction. In this case, an engagement part configured to engage with and retain the claw 91 may be provided on the side wall 122 of the housing 10. The attaching direction is not limited to that shown in the above embodiment, and the dust collecting attachment 70 may be attached to the housing 10 by being moved along the housing 10 downward, rightward, leftward, forward, or the like, depending on the configuration of the portions of the dust collecting attachment.

The claw 91 may be configured to engage with and retained by a portion of the housing 10 other than the engagement part 131. For example, the claw 91 may be configured to protrude toward a corner of the rectangular housing 10 in the attached state and may engage with the corner.

The engagement part 131 may have any configuration, as long as it can engage with and retain the claw 91 and may not be configured as a recess. For example, the engagement part 131 may be formed as a protrusion protruding from the side wall 86 and provided with a front surface for restricting the movement of the claw 91 in the front-rear direction and a lower surface for restricting the movement of the claw 91 in the up-down direction.

In the above embodiment, the housing 10 may not have the grooves 125 and the connecting parts 126 (inclined surfaces 127 and flat surfaces 128). In a case that the housing 10 has the groove(s) 125, the groove(s) 125 may extend in a direction other than the up-down direction, such as in the front-rear direction.

The housing 10 need not have the flat surface 128 between the groove 125 and the engagement part 131. The inclined surface 127 between the groove 125 and the engagement part 131 is not necessarily flat, but may have another shape configured to gradually separate from the plane P (gradually increase the distance from the plane P) from the groove 125 toward the engagement part 131.

The dust collecting attachment 70 may have a recess instead of the protrusion 89. In this case, the housing 10 may have a protrusion instead of the recess 135. Further, the positions of the protrusion 89 and the recess are not limited to the positions of the above-described embodiment and may be other positions.

The engagement piece 90 need not have the tab 92. Since the engagement piece 90 is elastically deformable (flexible), the user can remove the dust collecting attachment 70 from the oscillating multi-tool 1 by moving any portion of the engagement piece 90 away from the housing 10. In a case where the tab 92 is provided on the engagement piece 90, the tab 92 need not be provided at the rear end of the engagement piece 90. For example, the tab 92 may protrude outward in the left-right direction from the engagement piece 90.

The shapes of the covering part 80 and the suction hole 81 are not limited to the above-described embodiment as long as the covering part 80 covers at least a portion of the periphery of the tool mounting part 51. For example, the covering part 80 may be formed in a rectangular shape having the suction hole 81. The shape of the suction hole 81 may be other shapes such as an elliptical shape or a rectangular shape.

The first end part 76 of the discharging part 75 may be connected to the covering part 80 in any way, and for example, may be connected to the left one of the side walls 86, or may be connected to the front wall 85.

The discharging part 75 may extend in the up-down direction. For example, the discharging part 75 may extend so that the first end part 76 is connected to the side wall 86 and the second end part 77 is positioned below the side wall 86.

The shape of the discharging part 75 is not limited to the shape of the above-described embodiment. For example, the discharging part 75 may be formed as a flattened tube (pipe), and a flat hose (pipe) may be connected to the second end part 77.

The dust collecting attachment 70 may not necessarily be formed as a single (integral) member. For example, the dust collecting attachment 70 may be configured such that the covering part 80 and the discharging part 75 are formed as separate (discrete) members, and the discharging part 75 is connectable to the covering part 80.

The housing 10 may not necessarily be configured as a vibration-isolating housing. The shape of the front end part 11 and the shape of the lower end part 110 of the housing 10 are not limited to the shape of the above embodiment. The motor 41 may not be housed in the front end part 11, but may be housed in the central part 13, for example.

The dust collecting attachment 70 may be attached to a power tool other than the oscillating multi-tool 1. The term "power tool" herein specifically refers to a power tool in which the longitudinal axis of the housing intersects the drive axis of the spindle, among power tools powered by a battery or an external AC power source and used for processing a workpiece or the like. Other examples of the power tool include a rotary tool (e.g., grinder, sander, polisher) configured to rotationally drive the tool accessory around a predetermined drive axis.

The present disclosure is not limited to the embodiments described above, and various configurations can be implemented without departing from the scope thereof. For example, the technical features in the embodiments corresponding to the technical features in each of the forms described in the summary part may be replaced or combined as appropriate to solve some or all of the above-described problems or to achieve some or all of the above-described effects. Also, if the technical features are not described as essential herein, they may be omitted as appropriate.

DESCRIPTION OF THE REFERENCE NUMERALS

1: oscillating multi-tool, 2: outer housing, 3: inner housing, 5: spindle, 10: housing, 11: front end part, 12: rear end part, 13: central part, 41: motor, 45: transmission mechanism, 47: clamp mechanism, 51: tool mounting part, 61: tool accessory, 62: lever, 63: battery mounting part, 64: battery pack, 70: dust collecting attachment, 75: discharging part, 76: first end part, 77: second end part, 80: covering part, 81: suction hole, 82: bottom part, 84: peripheral wall, 85: front wall, 86: side wall, 87: rib, 89: protrusion, 90: engagement piece, 91: claw, 92: tab, 105: upper part, 110: lower end part, 120: peripheral wall, 121: front wall, 122: side wall, 123: rear wall, 125: groove, 126: connecting part, 127: inclined surface, 128: flat surface, 131: engagement part, 132: front surface, 133: lower surface, 135: recess, 140: bottom part, 141: first lower surface, 142: second lower surface, 143: inclined surface, 151: front part, 152: rear part, 200: hose, 411: output shaft, 471: clamp shaft, P: virtual plane, A1: drive axis, A2: rotational axis, A3: central axis, AR1, AR2: arrows showing attaching directions

The invention claimed is:

1. A dust collecting attachment removably attachable to a power tool that includes a housing and a spindle, the housing extending in a front-rear direction, the spindle extending along a drive axis extending in an up-down direction perpendicular to the front-rear direction and having a lower end part protruding downward from a front end part of the housing to form a tool mounting part to which a tool accessory is removably attachable, the dust collecting attachment being configured to collect dust generated during a processing operation performed on a workpiece by the power tool, the dust collecting attachment comprising:
 a covering part (i) having a suction hole, (ii) formed such that, in an attached state in which the dust collecting attachment is attached to the power tool, the drive axis passes through the suction hole and the covering part at least partially covers a periphery of the tool mounting part, and (iii) comprising:
  a bottom part provided with the suction hole; and
  a peripheral wall (i) surrounding the suction hole, (ii) connected to the bottom part, (iii) extending in the up-down direction, and (iv) including, in the attached state, a first wall, which is located at the front in the front-rear direction and extends along the suction hole, and a pair of second walls connected to the first wall and extending rearward from the first wall;
 a discharging part (i) connected to one of the pair of second walls of the covering part, (ii) extending in a direction that intersects the front-rear direction, and (iii) configured to discharge the dust from the inside of the covering part; and
 at least one elastically deformable engagement piece connected to the covering part and having a claw that (i) is configured to engage with the housing at a predetermined position of the housing and (ii) is, in a plan view, located outside of the peripheral wall surrounding the suction hole.

2. The dust collecting attachment according to claim 1, wherein:
 the at least one engagement piece extends in a direction that intersects the drive axis in the attached state.

3. The dust collecting attachment according to claim 1, wherein:
 the at least one engagement piece extends in the front-rear direction in the attached state.

4. The dust collecting attachment according to claim 3, wherein, in the attached state:
 a front end of the at least one engagement piece is connected to the covering part, and
 the claw is provided on a rear part of the at least one engagement piece in the front-rear direction.

5. The dust collecting attachment according to claim 1, wherein:
 the at least one engagement piece includes two engagement pieces, and
 the two engagement pieces face each other across a plane that contains the drive axis in the attached state.

6. The dust collecting attachment according to claim 1, wherein:
 the discharging part is a tubular member extending in the direction that intersects the front-rear direction,
 the discharging part includes a first end part and a second end part that is opposite to the first end part,
 the first end part is connected to the covering part and communicatively connects the inside of the covering part with the inside of the discharging part, and
 the second end part is configured to be operatively connected to a suction device.

7. The dust collecting attachment according to claim 1, wherein:
 the covering part, the at least one engagement piece, and the discharging part are formed of a single member.

8. The dust collecting attachment according to claim 1, wherein:
 the at least one engagement piece includes a tab that extends in a direction that is different from a direction in which the claw protrudes from the engagement piece and that is adapted to be pinched by a user.

9. The dust collecting attachment according to claim 1, wherein:
 the first wall is arc-shaped,
 the at least one engagement piece includes a pair of engagement pieces each having a front end,
 the pair of engagement pieces extend rearward in the front-rear direction with the front ends thereof respectively connected to the second walls, and face each other across a plane that contains the drive axis,
 the claw is provided on each of the pair of engagement pieces and protrudes toward the plane that contains the drive axis in the attached state, and
 each of the pair of engagement pieces includes a tab that is provided rearward of the claw, that protrudes rearward in the front-rear direction, and that is adapted to be pinched by a user.

10. The dust collecting attachment according to claim 1, wherein:
 the covering part includes a first protrusion or a first recess configured to engage with the housing at a position that is different from the predetermined position at which the claw engages with the housing.

11. The dust collecting attachment according to claim 2, wherein:
 the at least one engagement piece extends in the front-rear direction in the attached state.

12. The dust collecting attachment according to claim 11, wherein:
 a front end of the at least one engagement piece is connected to the covering part, and
 the claw is provided on a rear part of the at least one engagement piece in the front-rear direction.

13. The dust collecting attachment according to claim 12, wherein:
 the at least one engagement piece includes two engagement pieces, and
 the two engagement pieces face each other across a plane that contains the drive axis in the attached state.

14. A system comprising:
the dust collecting attachment according to claim 1; and
the power tool to which the dust collecting attachment is removably attachable, the power tool comprising:
the housing that includes an engagement part and a guiding part,
wherein:
the engagement part is configured to engage with the claw of the dust collecting attachment, and
the guiding part is configured to guide the claw toward the engagement part.

15. The system according to claim 14, wherein:
the covering part includes a protrusion, and
the housing includes a recess configured to engage with the protrusion at a position that is different from the predetermined position at which the claw engages with the engagement part.

16. The system according to claim 14, wherein:
the engagement part is disposed rearward of the guiding part and formed as a recess on a side wall of the housing, and
the guiding part includes: (i) a groove formed on the side wall and extending in the up-down direction; and (ii) an inclined surface provided between the groove and the engagement part in the front-rear direction and inclined from the groove toward the engagement part in a direction away from a plane that contains the drive axis.

17. The system according to claim 14, further comprising:
a motor housed in the front end part of the housing and having an output shaft extending in parallel with the spindle.

18. The system according to claim 14, wherein:
the covering part includes a recess, and
the housing includes a protrusion configured to engage with the recess at a position that is different from the predetermined position at which the claw engages with the engagement part.

19. The dust collecting attachment according to claim 1, wherein the claw is spaced rearward from the suction hole by the at least one elastically deformable engagement piece.

20. The dust collecting attachment according to claim 1, wherein the claw and the suction hole are on opposite sides of a plane that is perpendicular to the front-rear direction.

* * * * *